US012024779B2

(12) United States Patent
Shibayama et al.

(10) Patent No.: US 12,024,779 B2
(45) Date of Patent: Jul. 2, 2024

(54) FILM FORMING METHOD

(71) Applicant: Nissan Motor Co., Ltd., Yokohama (JP)

(72) Inventors: Hirohisa Shibayama, Kanagawa (JP); Koukichi Kamada, Kanagawa (JP); Naoya Tainaka, Kanagawa (JP); Yoshito Utsumi, Kanagawa (JP); Hidenobu Matsuyama, Kanagawa (JP); Eiji Shiotani, Kanagawa (JP); Toshio Ogiya, Kanagawa (JP); Haruhiko Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 316 days.

(21) Appl. No.: 17/598,922

(22) PCT Filed: Mar. 29, 2019

(86) PCT No.: PCT/JP2019/014148
§ 371 (c)(1),
(2) Date: Sep. 28, 2021

(87) PCT Pub. No.: WO2020/202304
PCT Pub. Date: Oct. 8, 2020

(65) Prior Publication Data
US 2022/0154344 A1 May 19, 2022

(51) Int. Cl.
*C23C 24/04* (2006.01)
*B22D 19/00* (2006.01)
*F02F 1/00* (2006.01)

(52) U.S. Cl.
CPC .......... *C23C 24/04* (2013.01); *B22D 19/0009* (2013.01); *B22D 19/0081* (2013.01); *F02F 1/00* (2013.01); *F02F 2200/06* (2013.01)

(58) Field of Classification Search
CPC ..................................................... C23C 24/04
See application file for complete search history.

(56) References Cited

U.S. PATENT DOCUMENTS

2022/0042177 A1* 2/2022 Shibayama ............. B22F 5/008

FOREIGN PATENT DOCUMENTS

EP 3 854 908 A1 7/2021
JP 2007-16737 A 1/2007

(Continued)

*Primary Examiner* — Dah-Wei D. Yuan
*Assistant Examiner* — Kristen A Dagenais
(74) *Attorney, Agent, or Firm* — Global IP Counselors, LLP

(57) ABSTRACT

A film forming method forms a coating film on a workpiece having at least two film-deposited portions which are not continuous with each other by moving a nozzle of a cold spray device relative to each other along a continuous movement trajectory. The movement trajectory includes at least two trajectories corresponding to the film-deposited portions and a connecting trajectory linking the trajectories of the film-deposited portions. The film-deposited portions are formed by continuously spraying a raw material powder from the nozzle by cold spraying to form a coating film on each of the plurality of film-deposited portions. A turnback point of the spraying is set on the connecting trajectory where a relative speed between the workpiece and the nozzle decreases in the movement trajectory.

5 Claims, 21 Drawing Sheets

(56) References Cited

FOREIGN PATENT DOCUMENTS

| | | | |
|---|---|---|---|
| JP | 2014-156790 | A | 8/2014 |
| JP | 2018-197370 | A | 12/2018 |
| WO | 2017/022505 | A1 | 2/2017 |

* cited by examiner

図 3

FILM FORMING METHOD

CROSS-REFERENCE TO RELATED APPLICATIONS

This application is a U.S. national stage application of International Application No. PCT/JP2019/014148, filed on Mar. 29, 2019.

BACKGROUND

Technical Field

The present invention relates to a method of forming a film by cold spraying.

Background Information

There is a known method for manufacturing a sliding member in which a valve seat having exceptional abrasion resistance at high temperature can be formed by blowing a powder of metal or another raw material by cold spraying onto a seating portion of an engine valve (Patent Document 1: WO 2017/022505 A1).

SUMMARY

When enabled for multi-valve capability, automobile engines are provided with a plurality of intake and exhaust valves. Therefore, when valve seats are formed by cold spraying in the seating portions of a plurality of valves, it is necessary for a cylinder head and a nozzle of a cold spray device to be moved relative to each other, the nozzle and the plurality of seating portions to be faced sequentially toward each other, and a raw material powder to be ejected from the nozzle and blown onto the seating portions faced toward the nozzle.

When the spraying of raw material powder is interrupted, the cold spray device requires a standby time of several minutes until the raw material powder will again be stably blown. Therefore, it is preferable that raw material powder be continuously sprayed for as long as possible without interruption. However, when one valve seat film is formed, the nozzle and the cylinder head are moved relative to each other in a 360° circle, but mishaps can occur, such as an overlapping portion being created at the film forming starting point and film formation finishing point of the circular trajectory, or a turnback point appearing where the nozzle movement speed reaches zero in order to form the next valve seat film from the film formation finishing point.

In a trajectory where a turnback point arises in the first layer of an overlapping portion, the inclination angle of the surface of the starting point in the first layer becomes steep, and when a second layer is sprayed at this location, the flattening of the raw material powder is hindered and an insufficient coating film is formed.

A problem to be solved by the present invention is to provide a cold-spraying film forming method with which the formation of an insufficient coating film can be prevented.

The present invention overcomes the problem described above by providing a film forming method in which a raw material powder is continuously sprayed to form a coating film along a continuous movement trajectory configured from non-mutually-continuous trajectories for a plurality of parts where a film is formed, and a connecting trajectory that links the trajectories for the plurality of parts where a film is formed, wherein a turnback point where a relative speed of a workpiece and a nozzle decreases in the movement trajectories is set on the connecting trajectory.

According to the present invention, a turnback point where the relative speed of a workpiece and a nozzle is low in a movement trajectory is set on a connection trajectory, and the turnback point will therefore not be in a coating film in a first layer of an overlapping portion. As a result, the forming of an insufficient coating film can be minimized.

BRIEF DESCRIPTION OF THE DRAWINGS

Referring now to the attached drawings which form a part of this original disclosure.

DETAILED DESCRIPTION OF EMBODIMENTS

Figure 1:
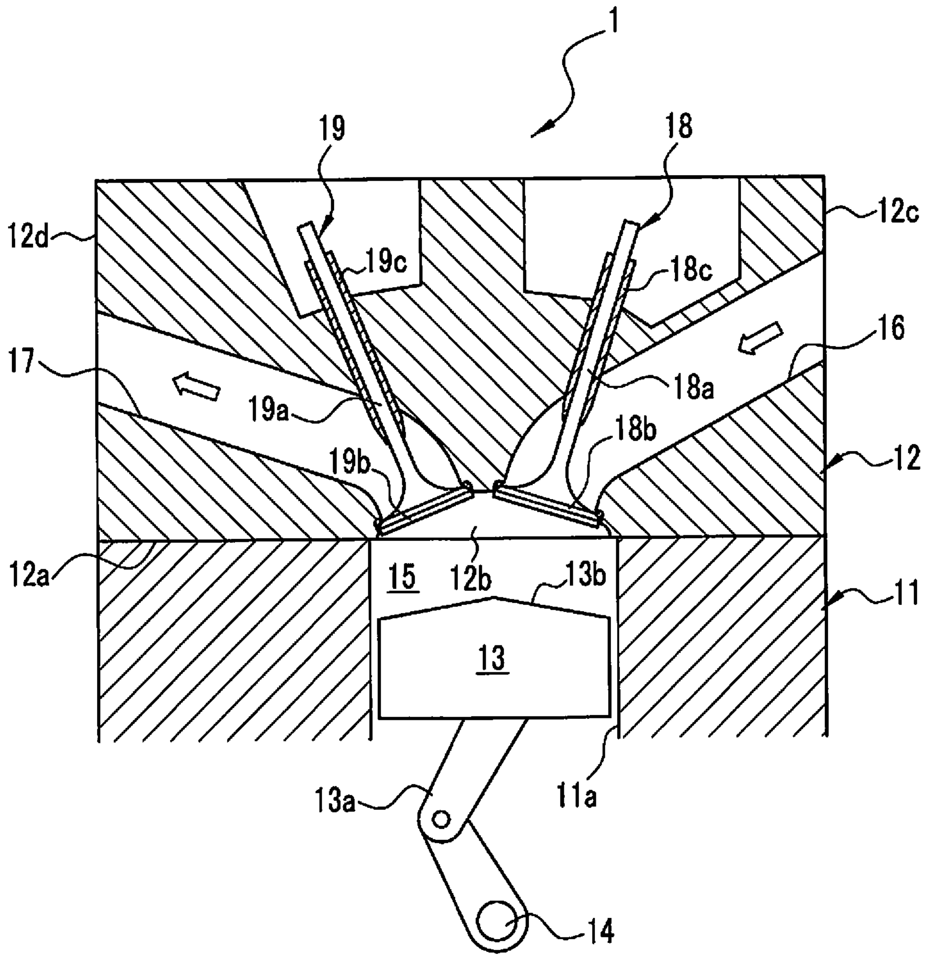
FIG. 1 is a cross-sectional view of a cylinder head on which a valve seat film is formed using a cold spray device according to the present invention.

An embodiment of the present invention is described below on the basis of the drawings. There shall first be described an internal combustion engine 1 provided with a valve seat film, in which a cold spray device of the embodiment is preferably applied. FIG. 1 is a cross-sectional view of the internal combustion engine 1, showing mainly the configuration around the cylinder head.

The internal combustion engine 1 comprises a cylinder block 11 and a cylinder head 12 assembled on an upper part of the cylinder block 11. The internal combustion engine 1 is, for example, an in-line four-cylinder gasoline engine, and the cylinder block 11 has four cylinders 11*a* arranged in the depth direction of the drawing. The cylinders 11*a* accommodate pistons 13 that move in a reciprocating manner vertically in the drawing, and the pistons 13 link via connecting rods 13*a* to crankshafts 14 extending in the depth direction of the drawing.

In a surface 12*a* of the cylinder head 12 that attaches to the cylinder block 11, in positions corresponding to the cylinders 11*a*, four recesses 12*b* constituting combustion chambers 15 of the cylinders are formed. The combustion chambers 15 are spaces for combusting an air-fuel mixture of fuel and intake air, and are configured from the recesses 12*b* of the cylinder head 12, top surfaces 13*b* of the pistons 13, and inner peripheral surfaces of the cylinders 11*a*.

The cylinder head 12 is provided with intake ports 16 via which the combustion chambers 15 and one side surface 12*c* of the cylinder head 12 communicate. The intake ports 16 assume a substantially cylindrical form that is curved, and guide intake air into the combustion chambers 15 from an intake manifold (not shown) connected to the side surface 12*c*. The cylinder head 12 is also provided with exhaust ports 17 that communicate the combustion chambers 15 and another side surface 12*d* of the cylinder head 12. The exhaust ports 17 have roughly cylindrical shapes curved in the same manner as the intake ports 16, and discharge exhaust air produced in the combustion chambers 15 to an exhaust manifold (not shown) connected to the side surface 12*d*. The internal combustion engine 1 of the present embodiment has two intake ports 16 and exhaust ports 17 each for one cylinder 11*a*.

The cylinder head 12 is provided with intake valves 18 that open and close the intake ports 16 in relation to the combustion chambers 15, and exhaust valves 19 that open and close the exhaust ports 17 in relation to the combustion chambers 15. The intake valves 18 and the exhaust valves 19 are each provided with a valve stem 18*a* and 19*a* in the form of a round rod and a valve head 18*b* or 19*b* in the form of a disc provided at a distal end of the valve stem 18*a* and 19*a*. The valve stems 18*a* and 19*a* are slidably inserted through roughly cylindrical valve guides 18*c* and 19*c* assembled in the cylinder head 12. The intake valves 18 and the exhaust valves 19 are thereby free to move along axial directions of the valve stems 18*a* and 19*a* in relation to the combustion chambers 15.

Figure 2:
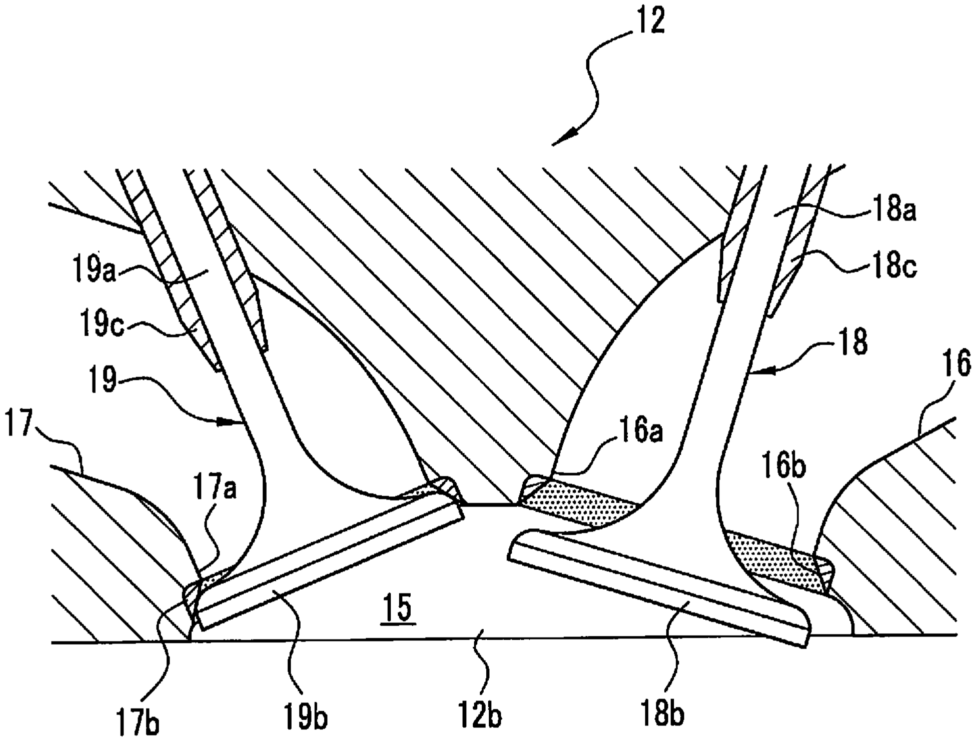
FIG. 2 is an enlarged cross-sectional view of a periphery of the valve of FIG. 2.

FIG. 2 is an enlarged view of a communicating portion between a combustion chamber 15, an intake port 16, and an exhaust port 17. The intake port 16 has a roughly cylindrical opening portion 16*a* provided in the portion communicating with the combustion chamber 15. Formed in an annular edge part of the opening portion 16*a* is an annular valve seat film 16*b* that comes into contact with the valve head 18*b* of the intake valve 18. When the intake valve 18 moves upward along the axial direction of the valve stem 18*a*, an upper surface of the valve head 18*b* comes into contact with the valve seat film 16*b* and closes up the intake port 16. Conversely, when the intake valve 18 moves downward along the axial direction of the valve stem 18*a*, a gap is formed between the upper surface of the valve head 18*b* and the valve seat film 16*b* and the intake port 16 is opened.

The exhaust port 17 is provided with a roughly circular opening 17*a* in the communicating portion between the intake port 16 and the combustion chamber 15, and formed in an annular edge part of the opening 17*a* is an annular valve seat film 17*b* that comes into contact with the valve head 19*b* of the exhaust valve 19. When the exhaust valve 19 moves upward along the axial direction of the valve stem 19*a*, an upper surface of the valve head 19*b* comes into contact with the valve seat film 17*b* and closes up the exhaust port 17. Conversely, when the exhaust valve 19 moves downward along the axial direction of the valve stem 19*a*, a gap is formed between the upper surface of the valve head 19*b* and the valve seat film 17*b* and the exhaust port 17 is opened. A diameter of the opening portion 16*a* of the intake port 16 is set larger than a diameter of the opening 17*a* of the exhaust port 17.

In the four-cycle internal combustion engine 1, only the intake valve 18 is opened when the piston 13 descends, whereby the air-fuel mixture is introduced into the cylinder 11*a* from the intake port 16 (intake stroke). The intake valve 18 and the exhaust valve 19 are then closed, and the piston 13 is raised to roughly top dead center to compress the air-fuel mixture inside the cylinder 11*a* (compression stroke). When the piston 13 has reaches roughly top dead center, the compressed air-fuel mixture is ignited by a sparkplug and the air-fuel mixture thereby explodes. This explosion causes the piston 13 to descend to bottom dead center, and the explosion is converted to rotational force via a linked crankshaft 14 (combustion/expansion stroke). Lastly, when the piston 13 reaches bottom dead center and begins to ascend again, only the exhaust valve 19 is opened and exhaust inside the cylinder 11*a* is discharged to the exhaust port 17 (exhaust stroke). The internal combustion engine 1 generates output by repeating the cycle described above.

The valve seat films 16*b* and 17*b* are formed by cold spraying directly on the annular edge parts of the openings 16*a* and 17*a* of the cylinder head 12. Cold spraying is a method in which a working gas at a temperature lower than the melting point or softening point of a raw material powder is brought to a supersonic flow, the working gas is charged with raw material powder carried by a carrier gas, the gas with the powder is sprayed from a nozzle tip to collide with a base material while in a solid-phase state, and a coating film is formed by plastic deformation of the raw material powder. In comparison to thermal spraying, in which a material is melted and deposited on a base material, the characteristics of cold spraying are that a dense coating film that does not oxidize can be obtained in the atmosphere, thermal alteration is minimized because the effect of heat on the material particles is small, the film is formed at a fast rate, the film can be made thicker, and adhesion efficiency is high. Because of the fast film-forming rate and the thick film in particular, cold spraying is suitable when the present invention is applied with structural materials such as the valve seat films 16*b* and 17*b* of the internal combustion engine 1.

Figure 3:
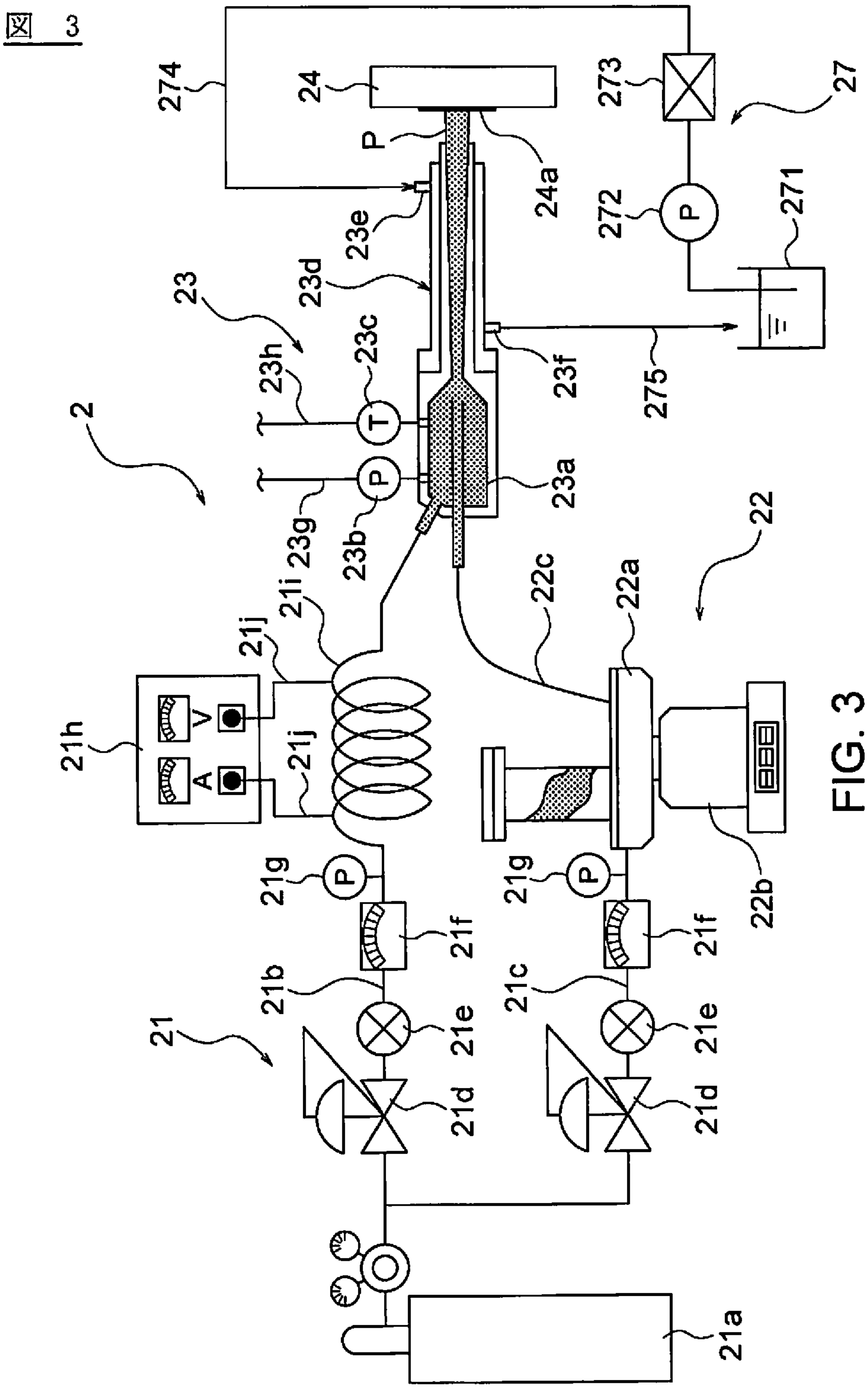
FIG. 3 is a configuration diagram of one embodiment of the cold spray device according to the present invention.

FIG. 3 is a schematic diagram of a cold spray device 2 of the present embodiment, which is used to form the valve seat films 16*b* and 17*b* described above. The cold spray device 2 of the present embodiment is provided with a gas supply section 21 that supplies the working gas and the carrier gas, a raw material powder supply section 22 that supplies the raw material powder for the valve seat films 16*b* and 17*b*, a spray gun 23 that sprays the raw material powder as a supersonic flow using working gas of which the temperature is not higher than the melting point of the powder, and a refrigerant circulation circuit 27 that cools a nozzle 23*d*.

The gas supply section 21 is provided with a compressed gas vessel 21*a*, a working gas line 21*b*, and a carrier gas line 21*c*. The working gas line 21*b* and the carrier gas line 21*c* are each provided with a pressure adjuster 21*d*, a flow rate adjustment valve 21*e*, a flow rate gauge 21*f*, and a pressure gauge 21*g*. The pressure adjusters 21*d*, the flow rate adjustment valves 21*e*, the flow rate gauges 21*f*, and the pressure gauges 21*g* are supplied to adjust the respective pressures and flow rates of the working gas and carrier gas from the compressed gas vessel 21*a*.

A tape heater or another heater 21*i* is installed in the working gas line 21*b*, and the heater 21*i* heats the working gas line 21*b* by being supplied with electric power from an electric power source 21*h* via electric power supply wires 21*j* and 21*j*. The working gas is introduced into a chamber 23*a* of the spray gun 23 after being heated by the heater 21*i* to a temperature lower than the melting point or softening point of the raw material powder. A pressure gauge 23*b* and a thermometer 23*c* are installed on the chamber 23*a*, a pressure value and a temperature value detected via respective signal lines 23*g* and 23*g* are outputted to a controller (not shown), and these values are supplied for feedback control of the pressure and temperature.

The raw material powder supply section 22 is provided with a raw material powder supply device 22*a*, and a weighing scale 22*b* and a raw material powder supply line 22*c* added to the raw material powder supply device 22*a*. The carrier gas from the compressed gas vessel 21*a* passes through the carrier gas line 21*c* and is introduced into the raw material powder supply device 22*a*. A predetermined amount of raw material powder weighed by the weighing scale 22*b* is carried into the chamber 23*a* via the raw material powder supply line 22*c*.

The spray gun 23 sprays the raw material powder P, which has been carried into the chamber 23*a* by the carrier gas, from the tip of the nozzle 23*d* at a supersonic flow with the aid of the working gas, and causes the raw material powder P to collide in a solid-phase state or in a solid-liquid coexistent state with a base material 24 to form a coating film 24*a*. In the present embodiment, the cylinder head 12 is applied as the base material 24, and the valve seat films 16*b* and 17*b* are formed by spraying the raw material powder P by cold spraying onto the annular edge parts of the openings 16*a* and 17*a* of the cylinder head 12.

The nozzle 23*d* is internally provided with a flow channel (not shown) through which water or another refrigerant flows. The tip end of the nozzle 23*d* is provided with a refrigerant introduction part 23*e* through which the refrigerant is introduced into the flow channel, and a base end of the nozzle 23*d* is provided with a refrigerant discharge part 23*f* through which the refrigerant in the flow channel is discharged. The refrigerant is introduced into the flow channel of the nozzle 23*d* through the refrigerant introduction part 23*e*, the refrigerant flows through the flow channel, and the refrigerant is discharged from the refrigerant discharge part 23*f*, whereby the nozzle 23*d* is cooled.

The refrigerant circulation circuit 27, via which the refrigerant is circulated through the flow channel of the nozzle 23*d*, is provided with a tank 271 that stores the refrigerant, an introduction pipe 274 connected to the above-described refrigerant introduction part 23*e*, a pump 272 that is connected to the introduction pipe 274 and that causes the refrigerant to flow between the tank 271 and the nozzle 23*d*, a cooler 273 that cools the refrigerant, and a discharge pipe 275 connected to the refrigerant discharge part 23*f*. The cooler 273 is composed of, for example, a heat exchanger, etc., and the cooler causes the refrigerant that has cooled the nozzle 23*d* and risen in temperature to exchange heat with air, water, gas, or another refrigerant, thus cooling the refrigerant.

Refrigerant stored in the tank 271 is drawn into the refrigerant circulation circuit 27 by the pump 272, and the refrigerant is supplied to the refrigerant introduction part 23*e* via the cooler 273. The refrigerant supplied to the refrigerant introduction part 23*e* flows through the flow channel in the nozzle 23*d* from the tip-end side toward the rear-end side, during which time the refrigerant exchanges heat with the nozzle 23*d* and the nozzle 23*d* is cooled. Having flowed to the rear-end side of the flow channel, the refrigerant is discharged from the refrigerant discharge part 23*f* to the discharge pipe 275, and returns to the tank 271. Thus, the refrigerant is circulated in the refrigerant circulation circuit 27 while being cooled, so that the nozzle 23*d* is cooled, and therefore, the raw material powder P can be kept from adhering to the spray passage of the nozzle 23*d*.

The valve seats of the cylinder head 12 require heat resistance and abrasion resistance high enough to withstand striking input from the valves in the combustion chambers 15, as well as thermal conductivity high enough to cool the combustion chambers 15. To comply with these requirements, the valve seat films 16*b* and 17*b*, which are formed from, for example, a powder of a precipitation-hardening copper alloy, make it possible to obtain valve seats that are harder than the cylinder head 12, which is formed from an aluminum alloy for casting, and that have exceptional heat resistance and abrasion resistance.

Because the valve seat films 16*b* and 17*b* are formed directly on the cylinder head 12, it is possible to achieve higher thermal conductivity than in prior-art valve seats in which separate seat rings are pressed-fitted and formed in port openings. Furthermore, compared to cases of using separate seat rings, not only is it possible to bring the valve seat films closer to a water jacket for cooling, but it is also possible to achieve secondary effects such as increasing throat diameters of the intake ports 16 and the exhaust ports 17 and promoting tumble flow by optimizing port shape.

The raw material powder P used to form the valve seat films 16*b* and 17*b* is preferably a metal that is harder than aluminum alloys for casting and that yields the heat resistance, abrasion resistance, and thermal conductivity needed for the valve seats; for example, it is preferable to use the precipitation-hardening copper alloy mentioned above. A Corson alloy containing nickel and silicon, chromium copper containing chromium, zirconium copper containing zirconium, etc., can be used as the precipitation-hardening copper alloy. Furthermore, for example: a precipitation-hardening copper alloy containing nickel, silicon, and chromium; a precipitation-hardening copper alloy containing nickel, silicon, and zirconium; a precipitation-hardening alloy containing nickel, silicon, chromium, and zirconium; a precipitation-hardening copper alloy containing chromium and zirconium; etc., can be applied.

Additionally, multiple types of raw material powders, e.g., a first raw material powder and a second raw material powder can be mixed to form the valve seat films 16*b* and 17*b*. In this case, for the first raw material powder it is preferable to use a metal that is harder than aluminum alloys for casting and that yields the heat resistance, abrasion resistance, and thermal conductivity needed for the valve seats; for example, it is preferable to use a precipitation-hardening copper alloy mentioned above. Additionally, a metal harder than the first raw material powder is preferably used as the second raw material powder. For example, an iron-based alloy, a cobalt-based alloy, a chromium-based alloy, a nickel-based alloy, a molybdenum-based alloy, or another alloy, or a ceramic, etc., can be applied as the second raw material powder. Additionally, one of these metals can be used alone, or a combination of two or more can be used as appropriate.

Valve seat films formed by mixing a first raw material powder and a second raw material powder harder than the first raw material powder can have better heat resistance and abrasion resistance than valve seat films formed from only a precipitation-hardening copper alloy. Such effects are achieved presumably because the second raw material powder causes an oxide coating film present on the surface of the cylinder head 12 to be removed and a new interface to be formed by exposure, and adhesiveness between the cylinder head 12 and the metal coating film improves. Such effects are also presumably because adhesiveness between the cylinder head 12 and the metal coating film are improved by an anchor effect brought about by the second raw material powder being embedded in the cylinder head 12. Furthermore, such effects are presumably because when the first raw material powder collides with the second raw material powder, some of the kinetic energy thus produced is converted to heat energy or some of the first raw material powder plastically deforms, and the heat produced by this process further promotes precipitation hardening in some of the precipitation-hardening copper alloy used as the first raw material powder.

In the cold spray device 2 of the present embodiment, the cylinder head 12 in which the valve seat films 16*b* and 17*b* are formed is secured to a pedestal 45, and the tip end of the nozzle 23*d* of the spray gun 23 is rotated along the annular edge parts of the openings 16*a* and 17*a* of the cylinder head 12, whereby raw material powder is sprayed. The cylinder head 12 is not caused to rotate and therefore does not need to occupy a large space, and the spray gun 23 has a smaller moment of inertia than the cylinder head 12 and therefore has exceptional rotational transient characteristics and responsiveness. However, because a high-pressure pipe (high-pressure hose) constituting the working gas line 21*b* is connected to the spray gun 23 as shown in FIG. 3, there is a possibility that the rotational transient characteristics and responsiveness will be impeded by deformation rigidity due to twisting of the hose of the working gas line 21*b* when the spray gun 23 is caused to rotate. In view of this, the rotational transient characteristics and responsiveness are improved by configuring the cold spray device 2 of the present embodiment as shown in FIGS. 4 to 8.

Figure 4:
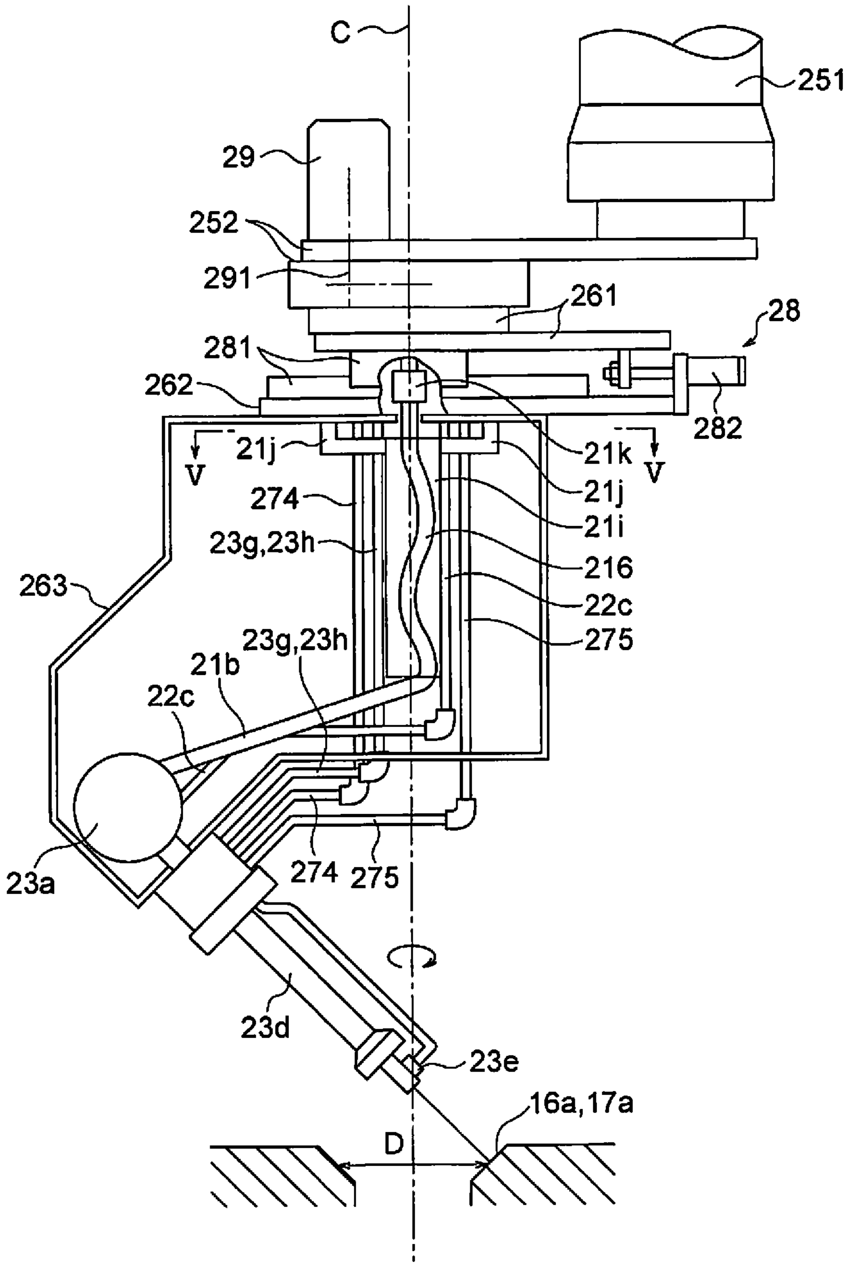
FIG. 4 is a front view of a spray gun of one embodiment of the cold spray device according to the present invention.
Figure 5:
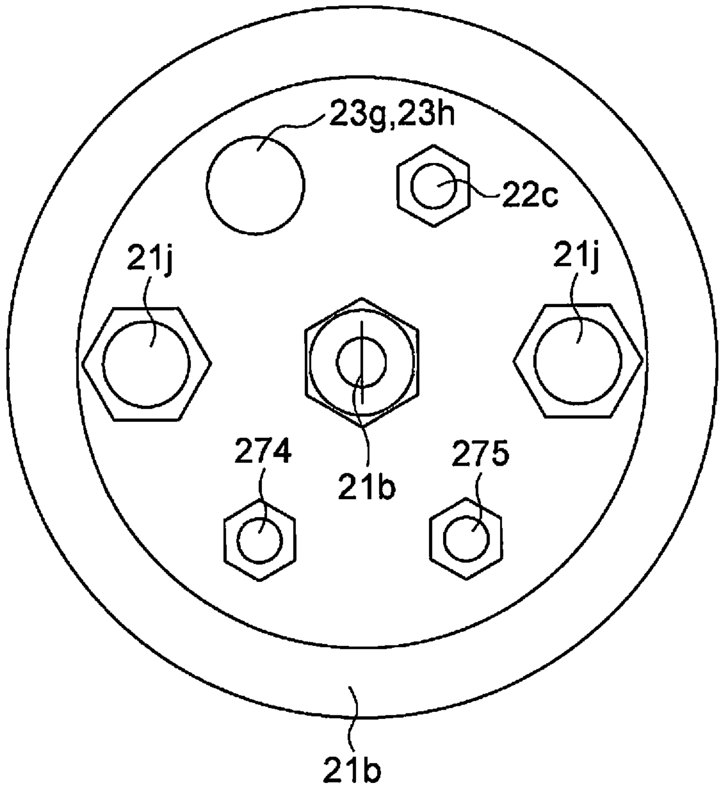
FIG. 5 is a cross-sectional view alone line along line V-V in FIG. 4.
Figure 6:
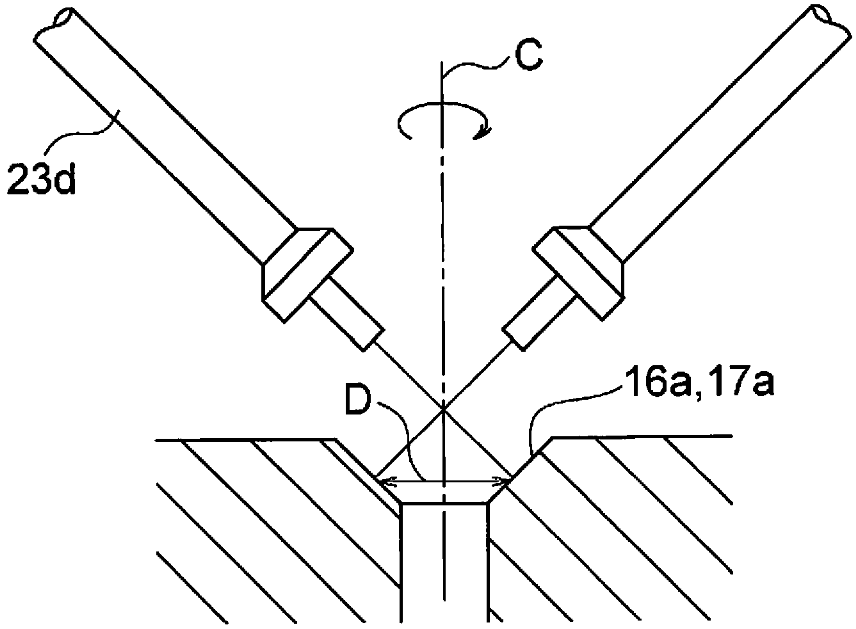
FIG. 6 is a front view of a state in which the spray gun in FIG. 4 has been offset.
Figure 7:
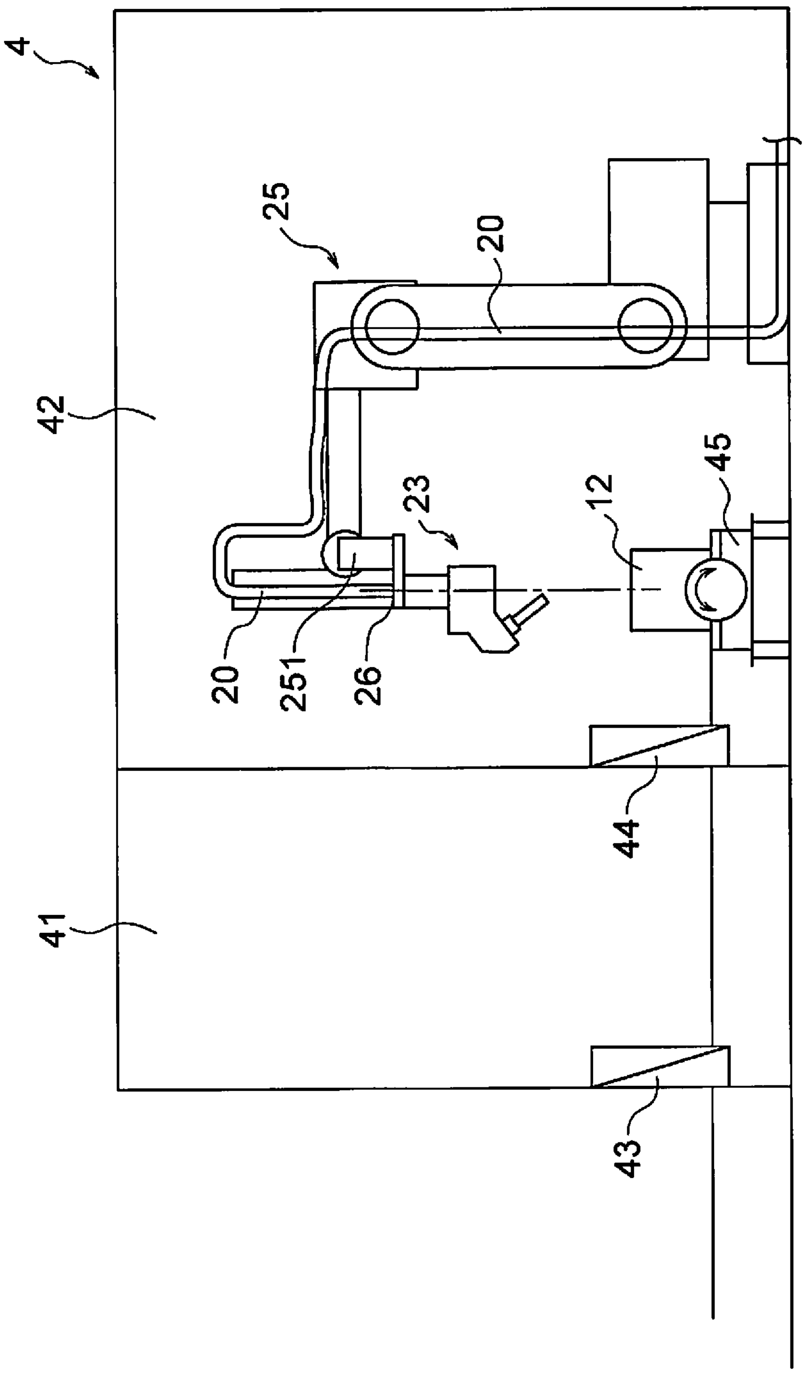
FIG. 7 is a front view of a film formation factory including the cold spray device according to present invention.
Figure 8:
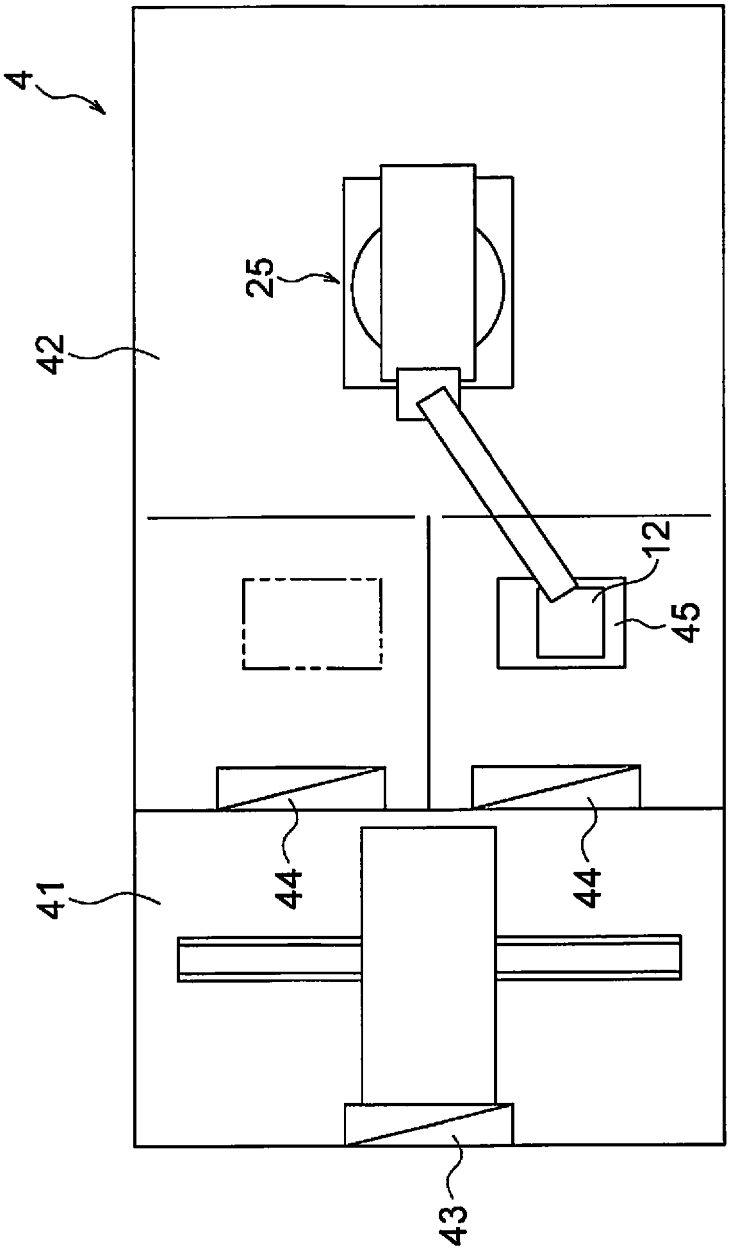
FIG. 8 is a plan view of FIG. 7.

FIG. 4 is a front view of the spray gun 23 of one embodiment of the cold spray device 2 according to the present invention, FIG. 5 is a cross-sectional view along line V-V in FIG. 4, FIG. 6 is a front view of a state in which the spray gun 23 in FIG. 4 is offset, FIG. 7 is a front view of a film formation factory including the cold spray device 2 according to the present invention, and FIG. 8 is a plan view of FIG. 7.

Figure 13:
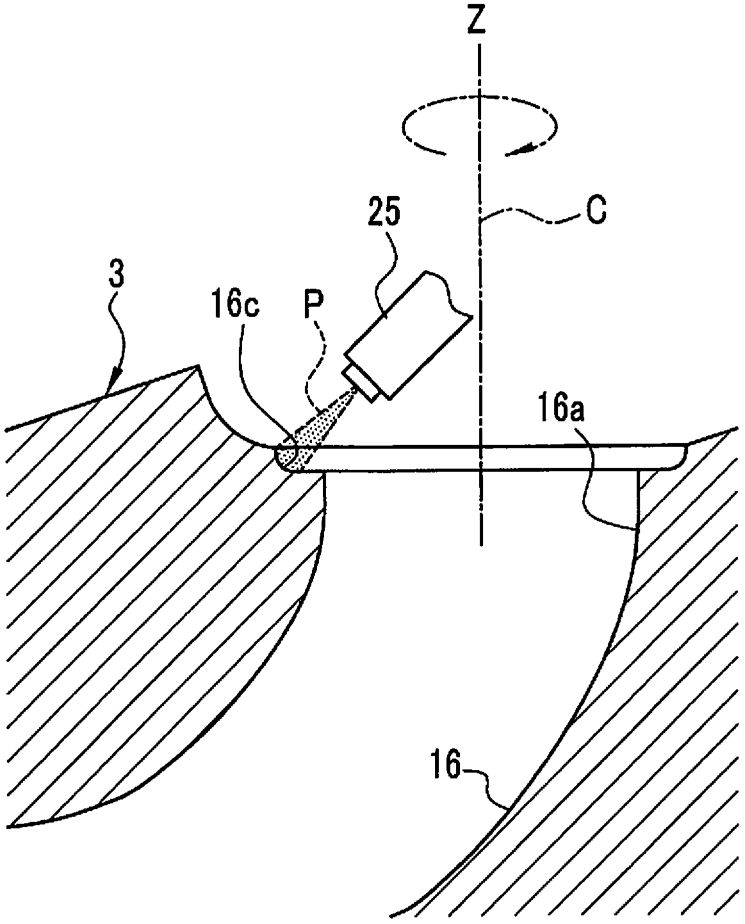
FIG. 13 is a cross-sectional view of a state in which a valve seat film is formed in the intake port of FIG. 12.

The cylinder head 12, which is a workpiece, is placed in a predetermined orientation on the pedestal 45 of a film formation booth 42 of a film formation factory 4 shown in FIGS. 7 and 8. For example, as shown in FIG. 13, the cylinder head 12 is secured to the pedestal 45 so that the recesses 12*b* of the cylinder head 12 are at the upper surface, and the pedestal 45 is tilted so that center lines of the openings 16*a* of the intake ports 16 or center lines of the openings 17*a* of the exhaust ports 17 are oriented in a vertical direction.

The film formation factory 4 is provided with the film formation booth 42, in which a film formation process is carried out, and a carrier booth 41. A pedestal 45 on which the cylinder head 12 is placed and an industrial robot 25 that holds the spray gun 23 are installed in the film formation booth 42. The carrier booth 41 is provided at the front portion of the film formation booth 42, cylinder heads 12 are carried in and out between the exterior and the carrier booth 41 through a door 43, and cylinder heads 12 are carried in and out between the carrier booth 41 and the film formation booth 42 through a door 44. For example, when the film formation process for one cylinder head 12 is being performed in the film formation booth 42, a cylinder head 12 that has ended the preceding process is carried out to the exterior from the carrier booth 41. Because the film formation process performed by the cold spray device 2 involves noise produced by supersonic shock waves, scattering of raw material powder, etc., the carrier booth 41 is installed and the film formation process is performed with the door 44 closed, whereby other operations can be performed simultaneously with the film formation process, such as carrying out a processed cylinder head 12 and carrying in a to-be-processed cylinder head 12.

The spray gun 23 is rotatably mounted on a base plate 26 secured to a hand 251 of the industrial robot 25 installed in the film formation booth 42 of the film formation factory 4 shown in FIGS. 7 and 8. A configuration of the spray gun 23 of the present embodiment is described below with reference to FIGS. 4 to 6. First, as shown in FIG. 4, a bracket 252 is secured to the hand 251 of the industrial robot 25, the base plate 26 is rotatably attached to the bracket 252, and the spray gun 23 is secured to the base plate 26.

More specifically, as shown in FIGS. 4 and 5, the bracket 252 is secured to the hand 251 of the industrial robot 25, a body of a motor 29 is secured to the bracket 252, a drive shaft 291 of the motor 29 is connected to a first base plate 261 via a pulley and a belt (not shown), and the first base plate 261 is caused to rotate relative to the bracket. The motor 29 rotates in two directions over a range of, for example, 360° at maximum. For example, if the drive shaft 291 is caused to rotate 360° clockwise in relation to the opening portion 16*a* of one intake port 16, the drive shaft 291 is caused to rotate 360° counterclockwise in relation to the opening portion 16*a* of the next intake port 16, and thereafter the same action is repeated.

The base plate 26 is composed of the first base plate 261 and a second base plate 262, and the first base plate 261 and the second base plate 262 are provided so as to be capable of sliding in a direction (the left-right direction in FIG. 4) orthogonal to a rotational axis C via a linear guide 281. An amount by which the second base plate 262 is offset relative to the first base plate 261 is adjusted and a spray diameter D of a film-forming material is set by driving a hydraulic cylinder 282.

A cover 263 is mounted on the second base plate 262 and the spray gun 23 is secured to a lower end part of the cover. The spray gun 23 is secured to the second base plate 262 via the cover 263 so that the spraying direction of the nozzle 23*d* is directed toward the rotational axis C. Because the second base plate 262 can be offset in relation to the first base plate 261 by the linear guide 281 and the hydraulic cylinder 282 mentioned above, the position of the tip end of the nozzle 23*d* of the spray gun 23 can be adjusted to be horizontal in relation to the rotational axis C.

Thus, when the position of the tip end of the nozzle 23*d* is set from being on the line of the rotational axis C shown in FIG. 4 to a position away from the rotational axis C as shown in FIG. 6, the spray diameter D will be smaller should the gun distance be the same. Because the openings 16*a* of the intake ports 16 are larger in diameter than the openings 17*a* of the exhaust ports 17, the tip end is in the position on the rotational axis C shown in FIG. 4 when the valve seat films 16*b* are formed in the openings 16*a* of the intake ports 16, and the tip end is in the position separated from the rotational axis C shown in FIG. 6 when the valve seat films 17*b* are formed in the openings 17*a* of the exhaust ports 17.

The working gas line 21*b* shown in FIG. 3, which guides high-pressure gas at 3-10 MPa supplied from the compressed gas vessel 21*a* to the spray gun 23, forms one pipe bundle 20 with other pipes described hereinafter, and hangs down to reach the spray gun 23 from an upper part of the base plate 26 mounted to the hand 251 of the industrial robot 25 as shown in FIG. 7. Near the base plate 26 in this configuration, the working gas line is separably connected via a swivel joint or another rotating coupling 21*k*, and the heater 21*i* is provided below the coupling, as shown in FIG. 4. The working gas line 21*b* shown in FIG. 4, extending from the rotating coupling 21*k* to the chamber 23*a*, is configured from a high-pressure hose that can withstand high pressures of 3-10 MPa, and is arranged along the rotational axis C so as to encircle the axis, as shown in FIG. 4. The working gas line 21*b* can be shaped into, for example, a helix in advance so as to encircle the rotational axis C, but a high-pressure hose that can withstand high pressures of 3-10 MPa is hard and retains shape; therefore, a shape-retaining mold can be provided on the outer periphery so that the high-pressure hose conforms to the helical shape.

The raw material powder supply line 22*c*, which is shown in FIG. 3 and which guides the raw material powder supplied from the raw material powder supply device 22*a* to the spray gun 23, is arranged in the periphery of the industrial robot 25 as the pipe bundle 20 shown in FIG. 7, is hung down to the spray gun 23 from the upper part of the base plate 26. Below the base plate 26 in this configuration, the raw material powder supply line 22*c* is configured in the pipe arrangement including metal pipes and metal couplings and is connected to the chamber 23*a* of the spray gun 23 as shown in FIG. 4.

The electric power supply wires 21*j* and 21*j*, which are shown in FIG. 3 and which guide electric power supplied from the electric power source 21*h* to the heater 21*i*, are arranged in the periphery of the industrial robot 25 as the pipe bundle 20 shown in FIG. 7, hung down from the upper part of the base plate 26, and connected to the heater 21*i*. Additionally, a signal wire 23*g* that outputs a detection signal from the pressure gauge 23*b* to a controller (not shown) and a signal wire 23*h* that outputs a detection signal from the thermometer 23*c* to a controller (not shown), these signal wires being shown in FIG. 3, are inserted through piping including metal pipes and metal couplings from the chamber 23*a* of the spray gun 23, and in this state the signal wires are guided from the chamber 23*a* of the spray gun 23 to the second base plate 262, and along with other components such as the working gas line 21*b*, the raw material powder supply line 22*c*, and the electric power supply wires 21*j*, are arranged in the periphery of the industrial robot 25 from the upper part of the base plate 26.

The introduction pipe 274 and the discharge pipe 275, which are shown in FIG. 3 and which guide the refrigerant supplied from the refrigerant circulation circuit 27 to the nozzle 23*d* of the spray gun 23, are arranged in the periphery of the industrial robot 25 as the pipe bundle 20 shown in FIG. 7, hung from the upper part of the base plate 26, and connected to the refrigerant introduction part 23*e* at the tip end of the nozzle 23*d* and the refrigerant discharge part 23*f* at the base end of the nozzle 23*d*. Below the base plate 26 in this configuration, the introduction pipe 274 and the discharge pipe 275 are configured in the piping including the metal pipes and metal couplings and are connected to the nozzle 23*d* of the spray gun 23, as shown in FIG. 4.

As described above, the working gas line 21*b*, which is configured from a high-pressure hose that is hard and very stiff against deformation, is arranged such that the rotating coupling 21*k* thereof is disposed on the line of the rotational axis C as shown in FIG. 4, and below the rotating coupling 21*k*, the working gas line extends along and encircles the rotational axis C. Other than the working gas line 21*b*, the electric power supply wires 21*j* and 21*j*, the raw material powder supply line 22*c*, the introduction pipe 274, the discharge pipe 275, and the signal wires 23*g*, 23*h* are disposed around the rotational axis C in positions encircling the working gas line 21*b*, as shown in FIG. 5.

Figure 9:
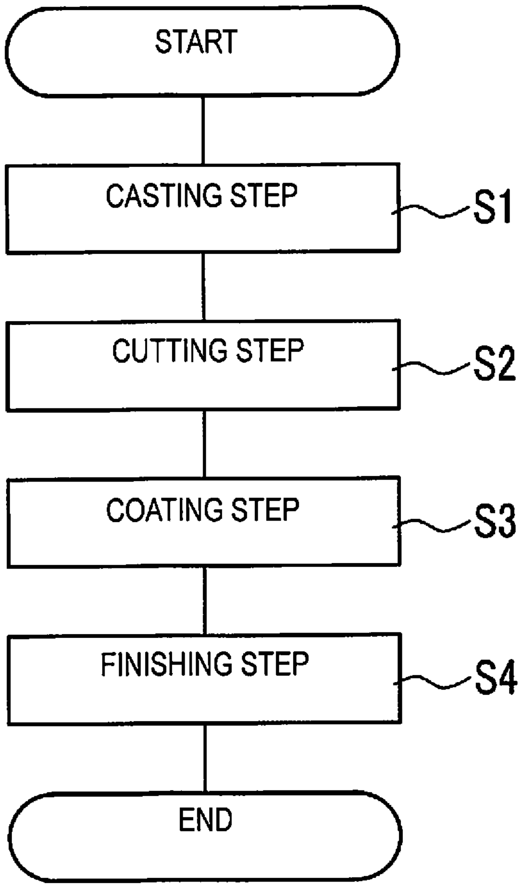
FIG. 9 is a flowchart of a procedure for manufacturing a cylinder head using the cold spray device according to the present invention.

Next, the method for manufacturing the cylinder head 12 provided with the valve seat films 16*b* and 17*b* shall be described. FIG. 9 is a flowchart of steps for processing the valve portion in the method for manufacturing the cylinder head 12 of the present embodiment. The method for manufacturing the cylinder head 12 of the present embodiment includes a casting step S1, a cutting step S2, a coating step S3, and a finishing step S4, as shown in FIG. 9. The steps for processing portions other than the valve are omitted for the sake of simplifying the description.

Figure 10:
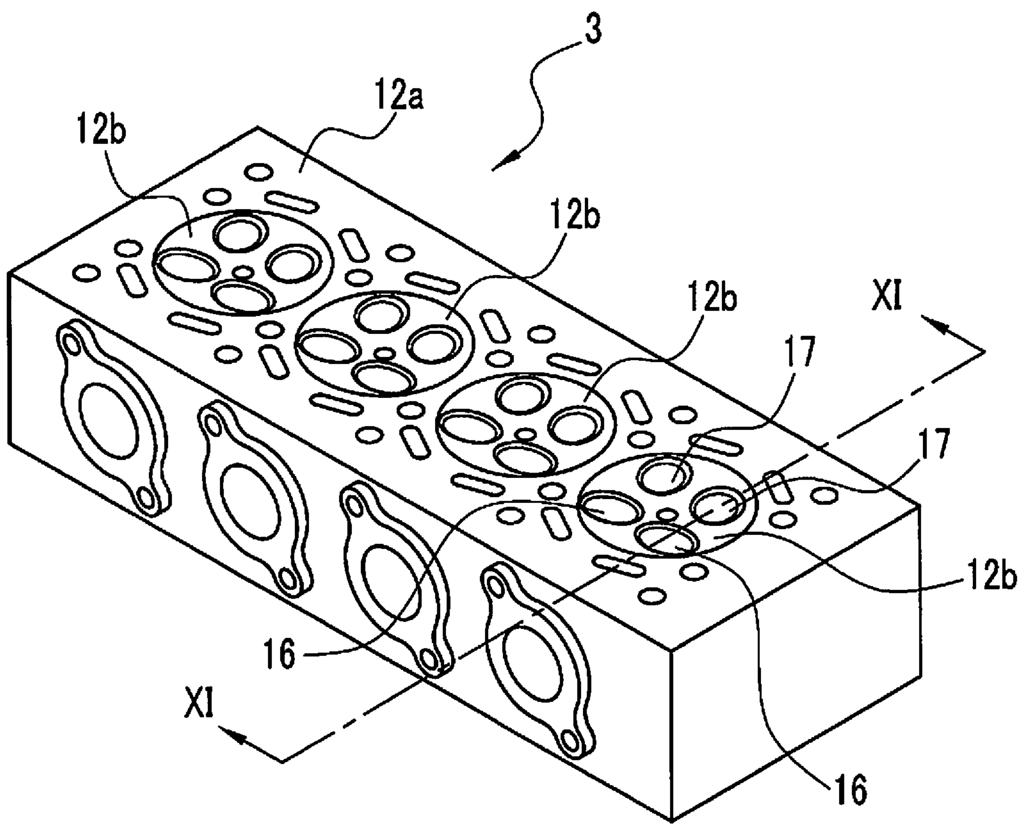
FIG. 10 is a perspective view of a cylinder head rough material on which a valve seat film is formed using the cold spray device according to the present invention.

In the casting step S1, an aluminum alloy for casting is poured into a mold in which a sand core has been set, and cylinder head rough material, having intake ports 16, exhaust ports 17, etc., formed in a body section, is shaped by casting. The intake ports 16 and the exhaust ports 17 are formed in the sand core, and recesses 12*b* are formed in the die. FIG. 10 is a perspective view of a cylinder head rough material 3 shaped by casting in the casting step S1, as seen from a side of an attachment surface 12*a* for the cylinder block 11. The cylinder head rough material 3 is provided with four recesses 12*b*, and the recesses 12*b* each have two intake ports 16 and two exhaust ports 17. The two intake ports 16 and the two exhaust ports 17 of an individual recess 12*b* merge together in the cylinder head rough material 3, and all communicate with openings provided in both side surfaces of the cylinder head rough material 3.

Figure 11:
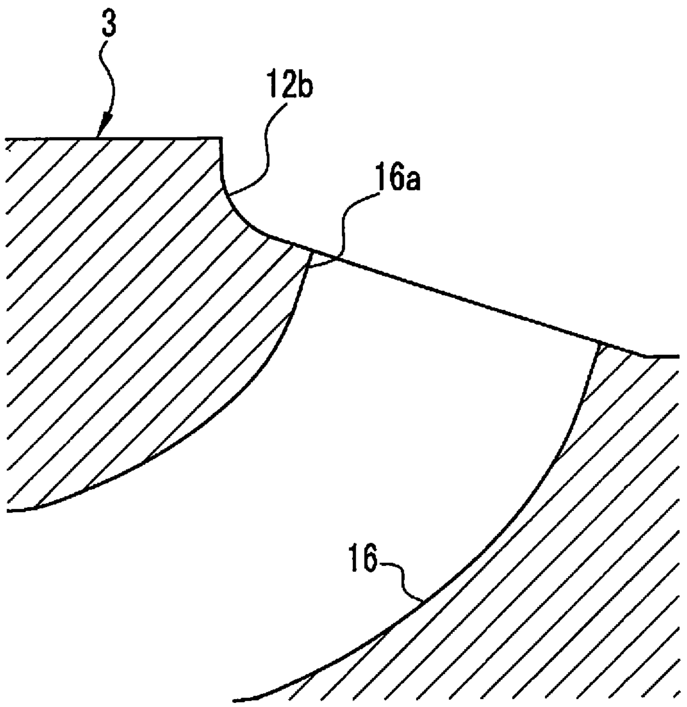
FIG. 11 is a cross-sectional view of an intake port along line XI-XI of FIG. 10.

FIG. 11 is a cross-sectional view of the cylinder head rough material 3 along line XI-XI of FIG. 10, showing an intake port 16. The intake port 16 is provided with a circular opening portion 16*a* exposed in a recess 12*b* of the cylinder head rough material 3.

Figure 12:
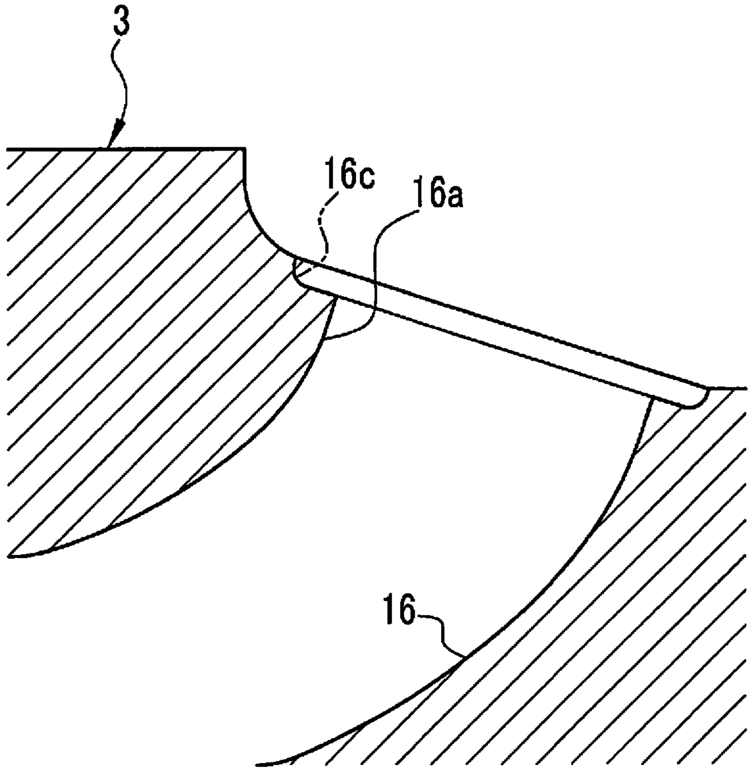
FIG. 12 is a cross-sectional view of a state in which an annular valve seat part has been formed by a cutting step in the intake port of FIG. 11.

In the next cutting step S2, the cylinder head rough material 3 is subjected to milling by an end mill, a ball end mill, etc., and an annular valve seat portion 16*c* is formed in the opening portion 16*a* of the intake port 16 as shown in FIG. 12. The annular valve seat portion 16*c* is an annular groove constituting a base shape of a valve seat film 16*b*, and is formed in an outer periphery of the opening portion 16*a*. In the method for manufacturing the cylinder head 12 of the present embodiment, the raw material powder P is sprayed by cold spraying to form a coating film on the annular valve seat portion 16*c*, and the valve seat film 16*b* is formed on the coating film as a foundation. Therefore, the annular valve seat portion 16*c* is formed to be one size larger than the valve seat film 16*b*.

In the coating step S3, the raw material powder P is sprayed onto the annular valve seat portion 16*c* of the cylinder head rough material 3 using the cold spray device 2 of the present embodiment, and the valve seat film 16*b* is formed. More specifically, in the coating step S3, the cylinder head rough material 3 is secured in place and the spray gun 23 is rotated at a constant speed so that the raw material powder P is blown onto the entire periphery of the annular valve seat portion 16*c* while the annular valve seat portion 16*c* and the nozzle 23*d* of the spray gun 23 are kept at a constant distance in the same orientation, as shown in FIG. 13.

The tip end of the nozzle 23*d* of the spray gun 23 is held in the hand 251 of the industrial robot 25, above the cylinder head 12 secured to the pedestal 45. The pedestal 45 or the industrial robot 25 sets the position of the cylinder head 12 or the spray gun 23 so that a center axis Z of the intake port 16 in which the valve seat film 16*b* is formed is vertical and is the same as the rotational axis C, as shown in FIG. 4. In this state, a coating film is formed on the entire periphery of the annular valve seat portion 16*c* due to the spray gun 23 being rotated about the C axis by the motor 29 while the raw material powder P is blown onto the annular valve seat portion 16*c* from the nozzle 23*d*.

While the coating step S3 is being carried out, the nozzle 23*d* introduces the refrigerant supplied from the refrigerant circulation circuit 27 into the flow channel from the refrigerant introduction part 23*e*. The refrigerant cools the nozzle 23*d* while flowing from the tip-end side toward the rear-end side of the flow channel formed inside the nozzle 23*d*. Having flowed to the rear-end side of the flow channel, the refrigerant is discharged from the flow channel by the refrigerant discharge part 23*f* and recovered.

When the spray gun 23 rotates once about the C axis and the formation of the valve seat film 16*b* ends, the rotation of the spray gun 23 is temporarily stopped. During this rotation stoppage, the industrial robot 25 moves the spray gun 23 so that the center axis Z of the intake port 16 in which the valve seat film 16*b* will next be formed coincides with a reference axis of the industrial robot 25. After the spray gun 23 has finished being moved by the industrial robot 25, the motor 29 restarts the rotation of the spray gun 23 and a valve seat film 16*b* is formed on the next intake port 16. The valve seat films 16*b* and 17*b* are hereinafter formed on all of the intake ports 16 and exhaust ports 17 of the cylinder head rough material 3 by repeating this operation. When the spray gun 23 switches between forming a valve seat film on the intake ports 16 and forming a valve seat film on the exhaust ports 17, the tilt of the cylinder head rough material 3 is changed by the pedestal 45.

Figure 16:
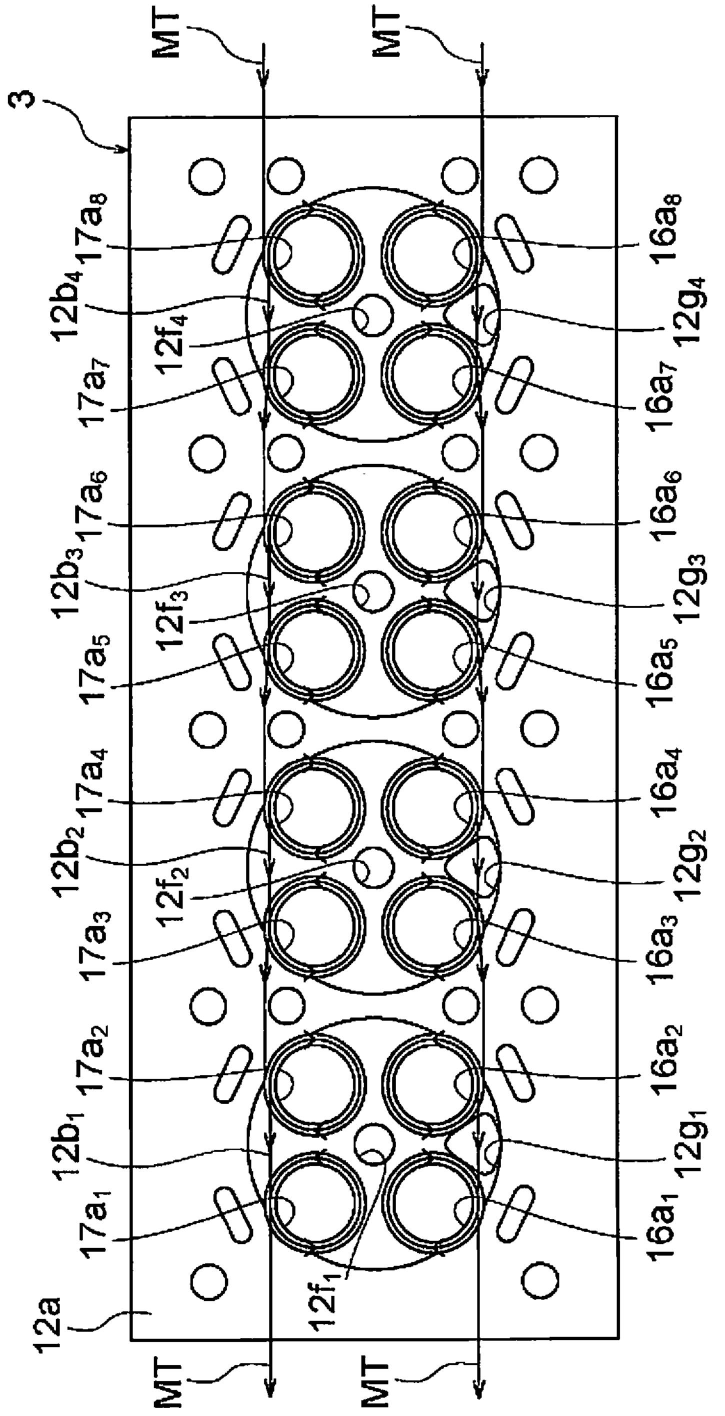
FIG. 16 is a plan view of a cylinder head rough material, depicting an example of movement trajectories when a nozzle of the cold spray device moves over openings of intake ports and exhaust ports in the film forming method according to the present invention.

FIG. 16 is a plan view of the cylinder head rough material 3, depicting an example of movement trajectories MT when the nozzle 23*d* of the cold spray device 2 moves over the openings of the intake ports 16 and the exhaust ports 17 in the film forming method according to the present invention. The nozzle 23*d* is moved along the movement trajectories MT shown by the arrows, relative to the openings 16*a* of the eight intake ports 16 and the openings 17*a* of the eight exhaust ports 17 of the cylinder head rough material 3 shown in FIG. 16. The following is a description of the movement trajectory MT relative to the intake ports 16, but the movement trajectory relative to the exhaust ports 17 is set in the same manner.

As described above, when the nozzle 23*d* rotates 360° clockwise in relation to one intake port 16, the nozzle then rotates 360° counterclockwise in relation to the next intake port 16. The nozzle 23*d* then moves in relation to the eight intake ports 16 while repeatedly rotating clockwise and counterclockwise. Specifically, the nozzle 23*d*, rotates counterclockwise in relation to openings 16$a_8$, 16$a_6$, 16$a_4$, and 16$a_2$ of four intake ports shown in FIG. 16, and rotates clockwise in relation to openings 16$a_7$, 16$a_5$, 16$a_3$, 16$a_1$ of the remaining intake ports.

The movement trajectory MT relative to the eight intake ports 16 is configured from a circular trajectory T for each of the annular valve seat portions 16*c* of the intake ports 16 and a connecting trajectory CT by which adjacent ones the circular trajectories T are connected, and the movement trajectory MT is thus a series of continuous trajectories. The nozzle 23*d* is thus moved along the movement trajectory MT while raw material powder is continuously sprayed without interruption from the nozzle 23*d*. The circular trajectory for one of the annular valve seat portion 16*c* begins from a film formation starting point, moves clockwise or counterclockwise, and then overlaps at the film formation starting point, this overlapping portion being a film formation finishing point.

Figure 20:
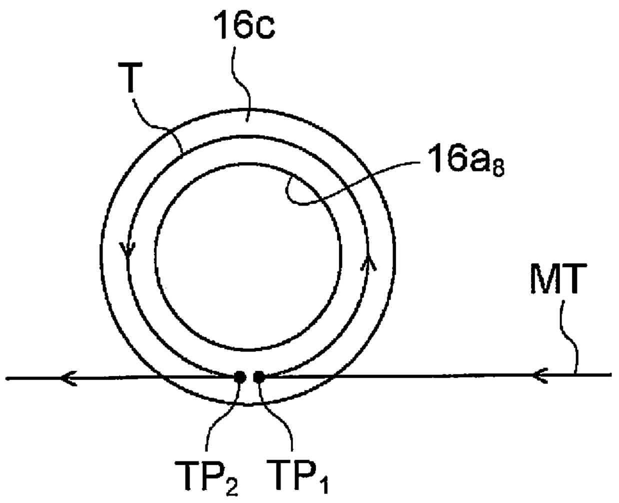
FIG. 20 is a drawing of a movement trajectory of a comparative example in which a film is formed with turnback points set at an overlapping portion of a film formation starting point and a film formation finishing point.

FIG. 20 is an enlarged plan view of a movement trajectory MT according to a comparative example, for the opening portion 16$a_8$ of one of the intake ports 16 positioned in the lower right of FIG. 16. The nozzle 23*d* is caused to rotate counterclockwise in relation to the annular valve seat portion 16*c* of the opening portion 16$a_8$ of this intake port 16; therefore, the movement trajectory MT according to the comparative example shown in FIG. 20 causes the nozzle 23*d* to move to the annular valve seat portion 16*c* from the right end toward the left in FIG. 20, and taking this point to be a film formation starting point, the nozzle 23*d* is caused to rotate counterclockwise in the circular trajectory, after which the orientation is changed at the film formation finishing point which overlaps the film formation starting point, and the nozzle 23*d* is moved to the left in FIG. 20. In the movement trajectory MT according to such a comparative example, there is a turnback point $TP_1$ at which the movement speed of the nozzle 23*d* reaches zero at the film formation starting point of the annular valve seat portion 16*c*, and there is a turnback point $TP_2$ at which the movement speed of the nozzle 23*d* reaches zero at the film formation finishing point. The terms "turnback points $TP_1$, $TP_2$" refer to points on the movement trajectory MT at which the movement speed of the nozzle 23*d* reaches zero or decreases to a value close to zero, and also refer to points at which the movement trajectory changes to a right angle or an acute angle (≤90°).

Figure 21:
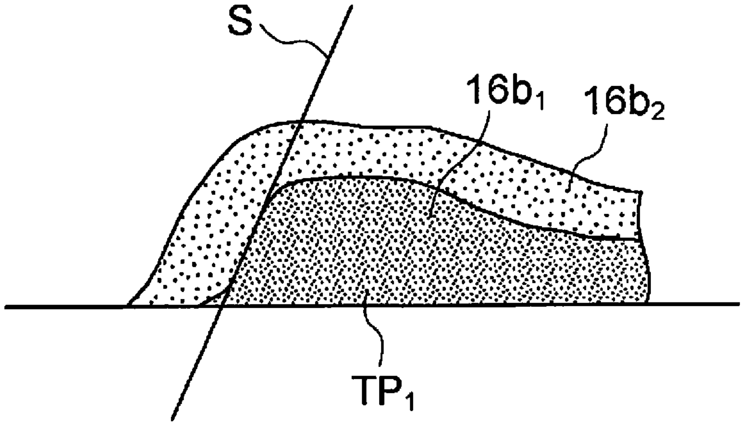
FIG. 21 is a cross-section of a coating film when a film has been formed along the movement trajectory of FIG. 20.

FIG. 21 is a cross-section of a coating film in an overlapping portion when a film has been formed along the movement trajectory MT of the comparative example of FIG. 20. At the first turnback point $TP_1$ located at the film formation starting point, the speed of the nozzle 23*d* temporarily reaches zero but the raw material powder continues to be sprayed; therefore, the valve seat film 16$b_1$ constituting the first layer will have a steep end part slant S as shown in FIG. 21. Cold spraying causes the raw material powder in a solid-phase state to collide with the base material at supersonic speed and plastically deform; therefore, when the second layer is sprayed on the surface of the first layer having a steep end part slant S, the raw material powder of the second layer will not adequately flatten and the internal pore diameter in the valve seat film 16$b_2$ of the second layer will increase. The undesirable increase in porosity due to such inadequate flattening is caused by the steep end part slant S in the valve seat film 16$b_1$ constituting the first layer. In other words, when the circular trajectory of the annular valve seat portion 16*c*, which is the part where a film is formed, includes a turnback point in the first layer within the range from the film formation starting point to the film formation finishing point (including the end point), the end part slant S will be steep at the turnback point. However, even if a turnback point is included in the second layer of the overlapping portion, the problem of inadequate flattening does not occur as long as the end part slant S of the valve seat film 16$b_2$ of the first layer is not steep.

Figure 17:
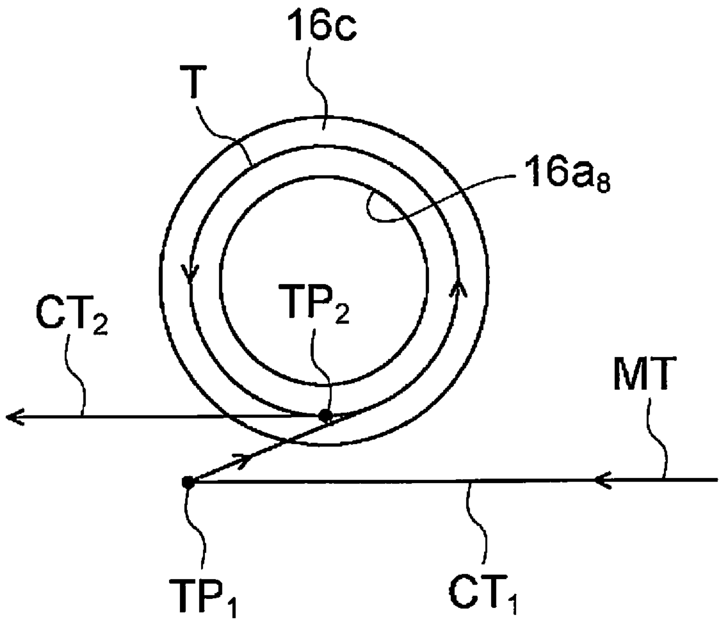
FIG. 17 is a plan view of a movement trajectory relative to one intake port of FIG. 16.

In the film forming method of the present embodiment, the turnback point $TP_1$ is set to be not on the circular trajectory T but on the connecting trajectory CT so that the turnback point $TP_1$ is not included in the first layer of the circular trajectory T. FIG. 17 is a plan view of the movement trajectory MT relative to the opening portion 16$a_8$ of the one intake port 16 of FIG. 16. The movement trajectory MT according to the present example shown in FIG. 17 causes the nozzle 23$d$ to move in a straight line toward the left from the right end of the drawing to the surface 12$a$ where the cylinder head rough material 3 attaches to the cylinder block 11, below and to the left of the annular valve seat portion 16$c$. The nozzle 23$d$ changes direction at the turnback point $TP_1$ and is moved diagonally right and upward toward the annular valve seat portion 16$c$, after which the nozzle 23$d$ is caused to rotate counterclockwise in the circular trajectory T with this point as the film formation starting point, the nozzle changes direction with the film formation finishing point, which overlaps the film formation starting point, as the turnback point $TP_2$ of the second layer, and the nozzle 23$d$ is moved to the left in FIG. 20.

Figure 18:
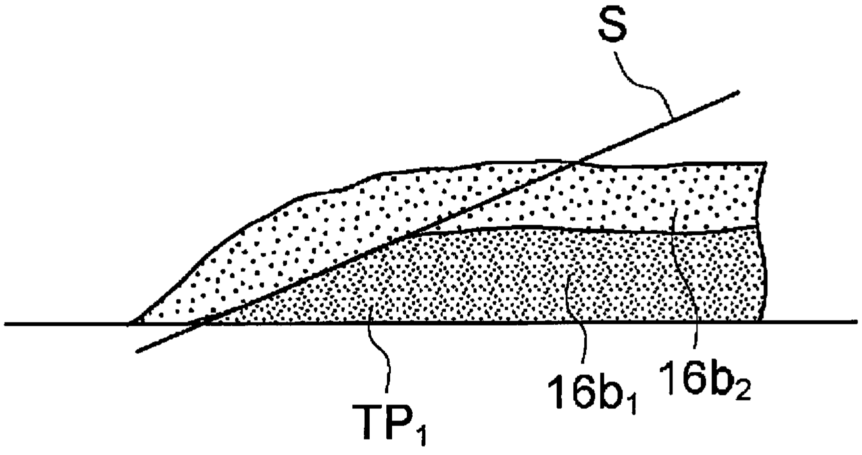
FIG. 18 is a cross-section of a coating film when a film has been formed along the movement trajectory of FIG. 17.

FIG. 18 is a cross-section of a coating film on an overlapping portion when a film has been formed in the movement trajectory MT of FIG. 17. Observing the overlapping portion of this annular valve seat portion 16$c$, the surface of the valve seat film 16$b_1$ of the first layer is formed flat because at the film formation starting point of the valve seat film 16$b_1$ of the first layer, the movement speed of the nozzle 23$d$ is a speed that is not zero. Accordingly, even though the valve seat film 16$b_2$ of the second layer, which is the film formation finishing point, overlaps the valve seat film 16$b_1$, the collision direction is substantially perpendicular to the surface of the valve seat film 16$b_1$ of the first layer; therefore, the raw material powder of the second layer is adequately flattened and the internal pore diameter of the valve seat film 16$b_2$ is adequately small. The turnback point $TP_1$ that can be the first layer of the overlapping portion, i.e., the turnback point set upstream of the film formation starting point of the annular valve seat portion 16$c$ is set on the connecting trajectory CT, but the turnback point $TP_2$ that becomes the second layer of the overlapping portion is set on the circular trajectory T because the end part slant S at this turnback point can be steep.

It should also be noted that when the nozzle 23$d$ is moved in relative fashion along the movement trajectory MT of the present example shown in FIG. 17, the distance between the nozzle 23$d$ and the attachment surface 12$a$ of the cylinder head rough material 3, i.e., the gun distance, may be increased at the turnback point $TP_1$ set on the connecting trajectory CT. In such instances, the gun distance is gradually increased as the nozzle approaches turnback point $TP_1$, after which the gun distance can gradually return to the original distance as the nozzle moves away from the turnback point $TP_1$. By increasing the gun distance between the nozzle 23$d$ and the attachment surface, a thickness of surplus coating film formed on the attachment surface 12$a$ is reduced, and therefore a depth by which the surplus coating film is removed in the finishing step S4 can be reduced.

Figure 19:
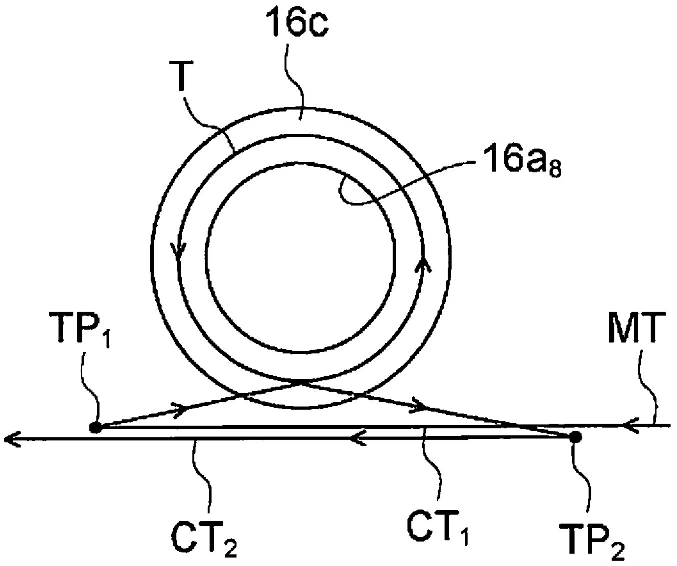
FIG. 19 is a plan view of another example of a movement trajectory relative to one intake port.

FIG. 19 is a plan view of another example of a movement trajectory MT for an opening portion 16$a_8$ of one intake port 16. In the movement trajectory MT shown in FIG. 17, the turnback point $TP_2$ of the second layer is set on the circular trajectory T for the annular valve seat portion 16$c$, but can be set on the attachment surface 12$a$ of the cylinder head rough material 3 as shown in FIG. 19, as with the turnback point $TP_1$ of the first layer.

Figure 14:
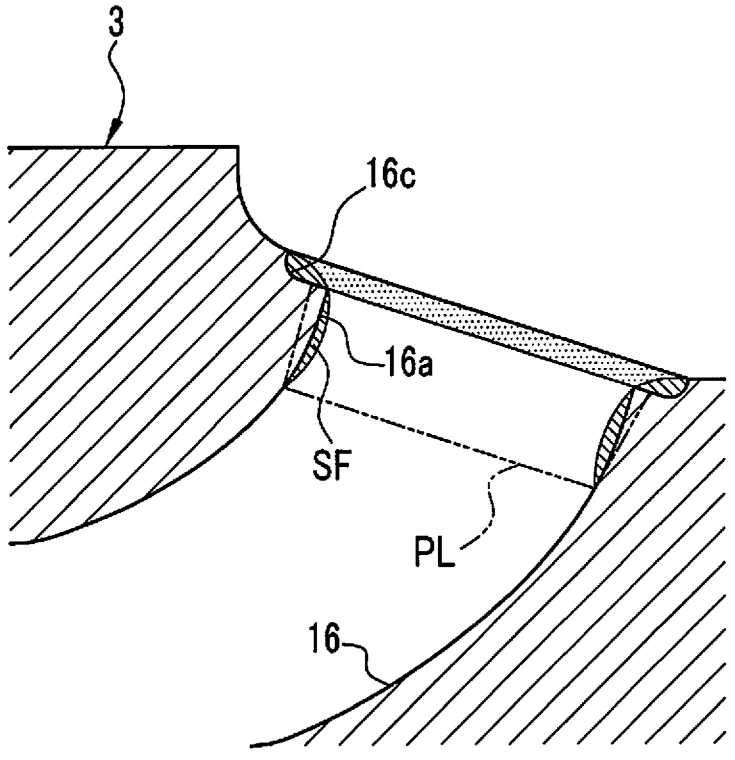
FIG. 14 is a cross-sectional view of an intake port in which a valve seat film has been formed.

Returning to FIG. 9, in the finishing step S4, finishing is performed on the valve seat films 16$b$ and 17$b$, and on the intake ports 16 and the exhaust ports 17. In the finishing of the valve seat films 16$b$ and 17$b$, the surfaces of the valve seat films 16$b$ and 17$b$ are milled using a ball end mill, and the valve seat films 16$b$ are adjusted to a predetermined shape. In the finishing of the intake ports 16, a ball end mill is inserted into the intake ports 16 from the openings 16$a$, and the inner peripheral surfaces of the intake ports 16 at the sides having the openings 16$a$ are each cut along a processing line PL shown in FIG. 14. The processing line PL is a range in which a surplus coating film SF, which results from the raw material powder P scattering and adhering to the inside of the intake port 16, is formed comparatively thick; i.e., a range in which the surplus coating film SF is formed thick enough to affect the intake performance of the intake port 16.

Figure 15:
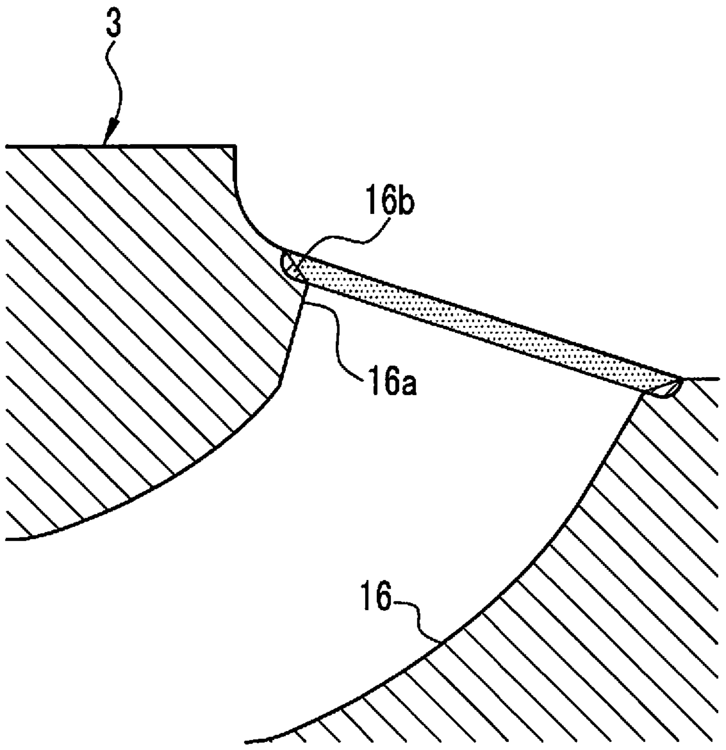
FIG. 15 is a cross-sectional view of an intake port after the finishing step of FIG. 9.

Thus, through the finishing step S4, surface roughness in the intake ports 16 due to cast-shaping is eliminated, and the surplus coating film SF formed in the coating step S3 can be removed. FIG. 15 shows an intake port 16 after the finishing step S4. As with the intake port 16, a valve seat film 17$b$ is formed in the exhaust port 17 via formation of a small-diameter part in the exhaust port 17 by cast-shaping, formation of an annular valve seat part by cutting, cold spraying on the annular valve seat part, and finishing. Therefore, a detailed description shall not be given for the procedure of forming the valve seat films 17$b$ in the exhaust ports 17.

As described above, in the film forming method using the cold spray device 2 of the present embodiment, the cylinder head rough material 3 having the plurality of annular valve seat portions 16$c$, which are not continuous with each other, and the nozzle 23$d$ of the cold spray device 2 are moved relative to each other along the continuous movement trajectory MT configured from the circular trajectories T for the annular valve seat portions 16$c$ and the connecting trajectories CT that link the plurality of circular trajectories T, while the raw material powder is continuously sprayed from the nozzle 23$d$, and the raw material powder is sprayed by cold spraying to form the valve seat films 16$b$ on each of the plurality of annular valve seat portions 16$c$, wherein the turnback points $TP_1$, at which the relative speed between the cylinder head rough material 3 and the nozzle 23$d$ decreases in the movement trajectory MT, are set not on the circular trajectories T but on the connecting trajectories CT. Due to this configuration, even though the valve seat films 16$b_2$ of the second layers, which are the film formation finishing points, overlap the valve seat films 16$b_1$, the collision direction is substantially perpendicular to the surfaces of the valve seat films 16$b_1$ of the first layers; therefore, the raw material powder of the second layers is adequately flattened and the internal pore diameters of the valve seat films 16$b_2$ are adequately small.

In the film forming method using the cold spray device 2 of the present embodiment, the parts where a film is formed are the entire peripheries of the openings 16$a$ and 17$a$ of the intake ports 16 or the exhaust ports 17 of the cylinder head 12, and the turnback points $TP_1$ are set in the surface 12$a$ of the cylinder head rough material 3 that attaches to the cylinder block 11. The surplus coating film formed along the connecting trajectories CT in the surface 12*a* of the cylinder head rough material 3 that attaches to the cylinder block 11 can thereby be easily removed along with other portions in the finishing step S4, which is a later step.

According to the film forming method using the cold spray device 2 of the present embodiment, because the gun distance between the nozzle 23*d* and the cylinder head rough material 3 is increased at the turnback points $TP_1$, the thickness of the surplus coating film formed on the attachment surface 12*a* decreases and the depth by which the surplus coating film is removed in the finishing step S4 can be reduced.

According to the film forming method using the cold spray device 2 of the present embodiment, the turnback points $TP_2$, which are set at the film formation finishing points of the annular valve seat portions 16*c*, are set on the circular trajectories T for the annular valve seat portions 16*c*. Turnback points set upstream from the film formation starting points of the annular valve seat portions 16*c* are set on the connecting trajectories CT, but the turnback points $TP_2$ that become the second layers of the overlapping portions may have a steep end part slant S, and can therefore be set on the circular trajectories T.

The annular valve seat portions 16*c* described above are equivalent to the parts where a film is formed according to the present invention.

The invention claimed is:

1. A film forming method for forming a coating film on a workpiece having at least two film-deposited portions which are not continuous with each other, the film forming method comprising:

moving a nozzle of a cold spray device relative to the workpiece along a continuous movement trajectory including trajectories of the film-deposited portions and a connecting trajectory linking the trajectories of the film-deposited portions while continuously spraying a raw material powder from the nozzle, continuously spraying the raw material powder from the nozzle by cold spraying to form a coating film on each of the film-deposited portions by the moving of the nozzle along the trajectories for the film-deposited portions, and the spraying of the raw material powder by cold spraying to form the coating film on a surface of the workpiece extending between one of the film-deposited portions and another the film-deposited portions by the movement of the nozzle along the connecting trajectory; and setting a turnback point on the connecting trajectory where a relative speed between the workpiece and the nozzle decreases in the movement trajectory.

2. The film forming method according to claim 1, wherein the turnback point on the connecting trajectory is set where the relative speed between the workpiece and the nozzle reaches zero in the movement trajectory.

3. The film forming method according to claim 1, wherein the film-deposited portions are entire peripheries of openings of intake ports or exhaust ports of a cylinder head, and the turnback points are set on a surface of the cylinder head that attaches to a cylinder block.

4. The film forming method according to claim 1, further comprising increasing a distance between the nozzle and the film-deposited portions at the turnback point.

5. The film forming method according to claim 1, wherein the setting of the turnback point on the connecting trajectory is set upstream from a film formation starting point of the film-deposited portions, and turnback points are set at a film formation finishing point of the film-deposited portions on the trajectories of the film-deposited portions.

* * * * *